US008701113B2

(12) United States Patent
Hildebrand et al.

(10) Patent No.: US 8,701,113 B2
(45) Date of Patent: Apr. 15, 2014

(54) SWITCH-AWARE PARALLEL FILE SYSTEM

(75) Inventors: Dean Hildebrand, San Jose, CA (US);
Renu Tewari, San Jose, CA (US)

(73) Assignee: International Business Machines Corporation, Armok, NY (US)

( * ) Notice: Subject to any disclaimer, the term of this patent is extended or adjusted under 35 U.S.C. 154(b) by 577 days.

(21) Appl. No.: 12/788,937

(22) Filed: May 27, 2010

(65) Prior Publication Data

US 2011/0296422 A1 Dec. 1, 2011

(51) Int. Cl.
*G06F 9/46* (2006.01)

(52) U.S. Cl.
USPC .......................................................... 718/102

(58) Field of Classification Search
USPC .......................................................... 718/102
See application file for complete search history.

(56) References Cited

U.S. PATENT DOCUMENTS

| | | | |
|---|---|---|---|
| 5,974,424 A * | 10/1999 | Schmuck et al. ............... 1/1 |
| 7,478,278 B2 | 1/2009 | Archer et al. | |
| 7,509,645 B2 | 3/2009 | Coates et al. | |
| 7,512,673 B2 | 3/2009 | Miloushev et al. | |
| 2004/0078466 A1* | 4/2004 | Coates et al. ............... 709/226 |
| 2006/0101025 A1 | 5/2006 | Tichy et al. | |
| 2007/0253437 A1* | 11/2007 | Radhakrishnan et al. .... 370/401 |
| 2008/0120435 A1 | 5/2008 | Moreira et al. | |
| 2009/0019098 A1 | 1/2009 | Gunda et al. | |
| 2009/0070489 A1 | 3/2009 | Lu et al. | |
| 2009/0106255 A1* | 4/2009 | Lacapra et al. ............... 707/10 |
| 2009/0125616 A1 | 5/2009 | Barsness et al. | |
| 2009/0157694 A1 | 6/2009 | Lee et al. | |

OTHER PUBLICATIONS

Sage A. Weil et al., "Ceph: A Scalable, High-Performance Distributed File System", Proceedings of the 7th Conference on Operating Systems Design and Implementation (OSDI '06) Nov. 2006, 11 pages.
Gary Grider et al., "PaScal—A New Parallel and Scalable Server IO Networking Infrastructure for Supporting Global Storage/File Systems in Large-size Linux Clusters", 25th IEEE Performance, Computing, and Communications Conference, IPCCC 2006, pp. 331-340.
Xuechen Zhang et al., "Making Resonance a Common Case: A High-Performance Implementation of Collective I/O on Parallel File Systems", IEEE International Symposium on Parallel & Distributed Processing, IPDPS 2009, pp. 1-12.

(Continued)

*Primary Examiner* — Tuan Dao
*Assistant Examiner* — Timothy A Mudrick
(74) *Attorney, Agent, or Firm* — Mohammed Kashef

(57) ABSTRACT

Embodiments of the invention related to a switch-aware parallel file system. A computing cluster is partitioned into a plurality of computing cluster building blocks comprising a parallel file system. Each computing cluster building block comprises a file system client, a storage module, a building block metadata module, and a building block network switch. The building block metadata module tracks a storage location of data allocated by the storage module within the computing cluster building block. The computing cluster further comprises a file system metadata module that tracks which of the plurality of computing cluster building blocks data is allocated among within the parallel file system. The computing cluster further comprises a file system network switch to provide the parallel file system with access to each of the plurality of computing cluster building blocks and the file system metadata module. At least one additional computing cluster building block is added to the computing cluster, if resource utilization of the computing cluster exceeds a predetermined threshold.

10 Claims, 4 Drawing Sheets

(56) References Cited

OTHER PUBLICATIONS

Santiago Dominguez-Dominguez et al., "Distributed Parallel File System for I/O Intensive Parallel Computing on Clusters", 2004 1st International Conference on Electrical and Electronics Engineering, (ICEEE), pp. 194-199.

F. Schmuck et al., "GPFS: A Shared-Disk File System for Large Computing Clusters", Proceedings of the USENIX Conference on File and Storage Technologies, San Francisco, CA 2002, 15 pages.

Sanjay Ghemawat et al., "The Google File System", Proceedings of the 19th ACM Symposium on Operating Systems Principles, Bolton Landing, NY 2003, pp. 29-43.

W. Tantisiriroj et al., "Crossing the Chasm: Sneaking a Parallel File System into Hadoop", Supercomputing '08 Petascale Data Storage Workshop, 2008, 3 pages.

D. Nagle et al., "Th Panasas ActiveScale Storage Cluster—Delivering Scalable High Bandwidth Storage", Proceedings of Supercomputing '04, Pittsburgh, PA 2004, 10 pages.

D. Borthakur, "HDFS Architecture", http://hadoop.apache.org/core/docs/current/hdfs_design.html, printed May 25, 2010, 14 pages.

Sun Microsystems Inc., "Lustre File System", White Paper, Dec. 2007, 20 pages.

I. Chavis et al., "A Guide to the IBM Clustered Network File System", IBM Redbooks, May 2008, 82 pages.

R. Ananthanarayanan et al., "Cloud Analytics: Do We Really Need to Reinvent the Storage Stack?", Workshop on Hot Topics in Cloud Computer, Jun. 2009, pp. 1-5.

O. Tatebe et al., "Grid Datafarm Architecture for Petascale Data Intensive Computing", Proceedings of the 2nd IEEE/ACM International Symposium on Cluster Computing and the Grid, Berlin, Germany, 2002, 9 pages.

P.H. Carns et al., "PVFS: A Parallel File System for Linux Clusters", Proceedings of the 4th Annual Linux Showcase and Conference, Atlanta, GA 2000, pp. 317-327.

B. Welch et al., "Scalable Performance of the Panasas Parallel File System", Proceedings of the 6th USENIX Conference on File and Storage Technologies, San Jose, CA 2008, pp. 17-33.

Amar Phanishayee et al., Measurement and Analysis of TCP Throughput Collapse in Cluster-based Storage Systems, Proceedings of the 6th USENIC Conference on File and Storage Technologies, San Jose, CA 2008, pp. 175-188.

\* cited by examiner

SWITCH-AWARE PARALLEL FILE SYSTEM

BACKGROUND

Embodiments of the invention relate to file systems, and in particular, to a switch-aware parallel file system.

A file system is a management structure for storing and organizing files and data. File systems are software components that use storage subsystems to maintain files and data. File systems impose a logical structure on a storage subsystem to allow client computers to create, store, and access data on the storage subsystem. A Distributed File System is a file system that supports sharing of files and storage resources for multiple clients over a network. An Internet-Scale File System is a distributed file system designed to run on low-cost commodity hardware, which is suitable for applications with large data sets. A cluster file system is a type of distributed file system that allows multiple compute nodes in a computing cluster to simultaneously access the same data stored within the computing cluster. A parallel file system is a type of distributed file system that distributes file system data across multiple servers and provides for concurrent access for multiple tasks of a parallel application.

A computing cluster includes multiple systems that interact with each other to provide client systems with data, applications, and other system resources as a single entity. Computing clusters typically have a file system manage data storage within the computing cluster. Computing clusters increases scalability by allowing servers and shared storage devices to be incrementally added. Computing clusters use redundancy to increase system availability and withstand hardware failures.

Supercomputers (e.g., IBM General Parallel File System) use parallel file systems to transfer large amounts of data at high speeds, which reduces a likelihood of any one storage node becoming a performance bottleneck. However, uses of supercomputers in commodity data centers are limited because data striping creates a many-to-many architecture of storage nodes to compute nodes, which requires expensive networking hardware to achieve acceptable performance.

Performance bottlenecks would arise in modern data centers that use smaller commodity switches, if parallel file systems were used. Commodity switches lack sufficient buffer space for each port, which causes packets to be dropped if too many packets are directed towards a single port. Commodity switches also have a limited number of ports, necessitating a hierarchy of switches between compute nodes and storage nodes. Consequently, more nodes must share a decreasing amount of available bandwidth to the parallel file system with each successive level in the hierarchy.

Cheaper commodity-based computing clusters do not match performance of supercomputers due to inherent limitations of low-end hardware. Cloud computing and software frameworks (e.g. MapReduce) for processing and generating large data sets enable use of inexpensive commodity-based computing clusters in data centers. Many data center use internet-scale file systems that rely on co-locating compute processing and required data. The internet-scale file systems avoid bottlenecks created by parallel file systems by striping data in very large chunks (e.g. 64 MB), directly on compute nodes with each job performing local data access. However, compute and data co-located creates other limitations in system architecture. For example, data needs to be replicated on multiple nodes to prevent data loss and alleviate I/O bottlenecks, which increase availability and integrity while proportionally reducing available disk space. In addition, general or traditional applications cannot utilize these file systems because of their lack of Portable Operating System Interface for Unix (POSIX) support and data sharing semantics and their limited support for remote data access using Network File System (NFS) or Common Internet File System (CIFS) protocols.

Typical data centers use multi-tier trees of network switches to create computing clusters. Servers are connected directly into a lower tier consisting of smaller switches with an upper tier that aggregates the lower tier. The network infrastructure will be oversubscribed by using large switches in the upper tiers. The oversubscription is due to cost limitations for typical data centers. Accordingly, the oversubscription creates inter-switch bottleneck that constrains data access in data centers.

BRIEF SUMMARY

Embodiments of the invention relate to a switch-aware parallel file system. An aspect of the invention includes a switch-aware parallel file system. The switch-aware parallel file system may comprise a plurality of computing cluster building blocks, which comprise a parallel file system. Each of the plurality of computing cluster building blocks may comprise a file system client. The file system client serves a file system application request. Each of the plurality of computing cluster building blocks may further comprise a storage module coupled to the file system client. The storage module serves a data request for the file system client.

Each of the plurality of computing cluster building blocks may further comprise a building block metadata module coupled to the storage module. The building block metadata module tracks a storage location of data allocated by the storage module within the computing cluster building block. Each of the plurality of computing cluster building blocks may further comprise a file system metadata module coupled to the plurality of computing cluster building blocks, the file system metadata module tracks which of the plurality of computing cluster building blocks data is allocated among within the parallel file system.

Another aspect of the invention includes a method for reducing inter-switch performance bottlenecks in a parallel file system. The method may comprise partitioning a computing cluster into a plurality of computing cluster building blocks. The plurality of computing cluster building blocks comprises a parallel file system. Each computing cluster building block may comprise a file system client, a storage module, a building block metadata module, and a building block network switch. The method may further comprise providing the parallel file system with access to each of the plurality computing cluster building blocks. The method may further comprise tracking which of the plurality of computing cluster building blocks data is allocated among within the parallel file system. The method may further comprise tracking a storage location of data allocated within each of the computing cluster building blocks.

A computer program product for reducing inter-switch performance bottlenecks in a parallel file system. The computer program product may include a computer readable storage medium having computer readable program code embodied therewith. The computer readable program code may comprise computer readable program code to provide a parallel file system with access to each of a plurality of computing cluster building blocks in a computing cluster. The plurality of computing cluster building blocks comprises the parallel file system. Each computing cluster building block may comprise a file system client, a storage module, a building block metadata module, and a building block network switch.

The computer readable program code may further comprise computer readable program code to create a data object for data to be written to in response to a data request by a file system client within one of the plurality of computing cluster building block. The data object being created in a computing cluster building block where the file system client is located. The computer readable program code may comprise computer readable program code to track which of the plurality of computing cluster building blocks data is allocated among within the parallel file system. The computer readable program code may further comprise computer readable program code to track a storage location of data allocated within each of the plurality of computing cluster building blocks. The computer readable program code may further comprise computer readable program code to provide a file system client for each of the plurality of computing cluster building blocks with access to data allocated among each of the plurality of computing cluster building blocks.

These and other, features, aspects, and advantages of the present invention will be apparent with reference to the following detailed description and appended claims.

DETAILED DESCRIPTION

Embodiments of the invention relate to a switch-aware parallel file system for reducing inter-switch performance bottlenecks. According to an embodiment of the present invention, the switch-aware parallel file system is comprised in a computing cluster. The switch-aware parallel file system uses parallel data access within a set of nodes with the highest potential aggregate bandwidth. For example, the highest aggregate bandwidth in data center architectures is between all servers connected to a leaf switch. A leaf switch is subject to oversubscription once servers access data outside of the leaf switch, which drastically reduces performance.

In one embodiment, the switch-aware parallel file system organizes a data center's servers and storage into one or more computing cluster building blocks. Each computing cluster building block consists of a leaf switch, its attached set of servers and storage, and a building block metadata module. For example, the number of computing cluster building blocks can scale with the number of leaf switches in the data center, enabling large-scale and incremental expansion of a data center. The building block metadata module tracks storage location of data allocated within its building block.

In another embodiment, the switch-aware parallel file system has a file system metadata module. The file system metadata module maintains a mapping of the files and directories stored within each building block. In addition, the switch-aware parallel file system includes one or more file system network switches that connect the computing cluster building blocks and the file system metadata module.

In an exemplary embodiment, the switch-aware parallel file system modifies the striping of a file to a switch and its connected servers to avoid network oversubscription, which results in inter-switch performance bottlenecks. Accordingly, stand-alone applications, internet workloads, and moderate sized parallel applications can all achieve performance of a parallel file system without the expensive switching hardware. As a result, more servers can connect to a single leaf switch and take advantage of parallel data access, as larger switches become more inexpensive.

Figure 1:
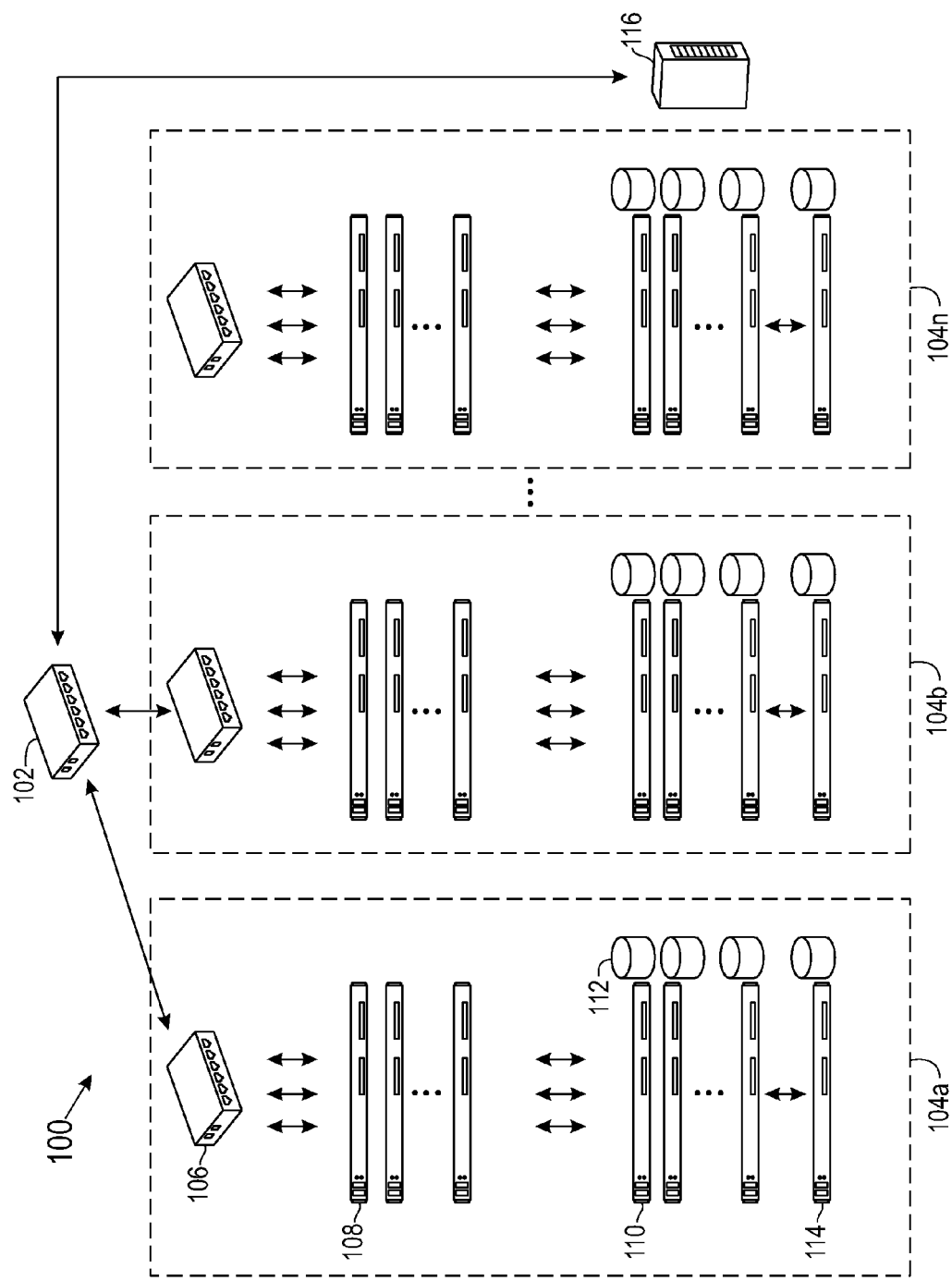
FIG. 1 illustrates a diagram of a computing cluster with a switch-aware parallel file system, according to one embodiment.

Referring now to FIG. 1, there is illustrated a diagram of computing cluster 100 with a switch-aware parallel file system, according to one embodiment. The computing cluster 100 includes a file system network switch 102. The file system network switch 102 is coupled to a file system metadata module 116. The file system network switch 102 is further coupled to a plurality of computing cluster building blocks 104a, 104b . . . 104n. Each of the plurality of computing cluster building blocks comprises a building block network switch 106, one or more compute nodes 108, one or more storage nodes 110, and a building block metadata module 114. The storage nodes 110 are coupled to a storage subsystem 112.

According to embodiments of the invention, storage subsystem 112 may include a shared storage subsystem and a locally attached storage subsystem. In an exemplary embodiment, the shared storage subsystem may include, but is not limited to, a storage area network (SAN) device. In another exemplary embodiment, the locally attached storage includes a storage device (e.g. disk array, local Serial Advanced Technology Attachment (SATA) disks) directly attached to the storage nodes 110 through an interface standard. For example, interface standards include, but are not limited to, Fiber Channel (FC), Small Computer System Interface (SCSI) or Integrated Drive Electronics (IDE).

Figure 2:
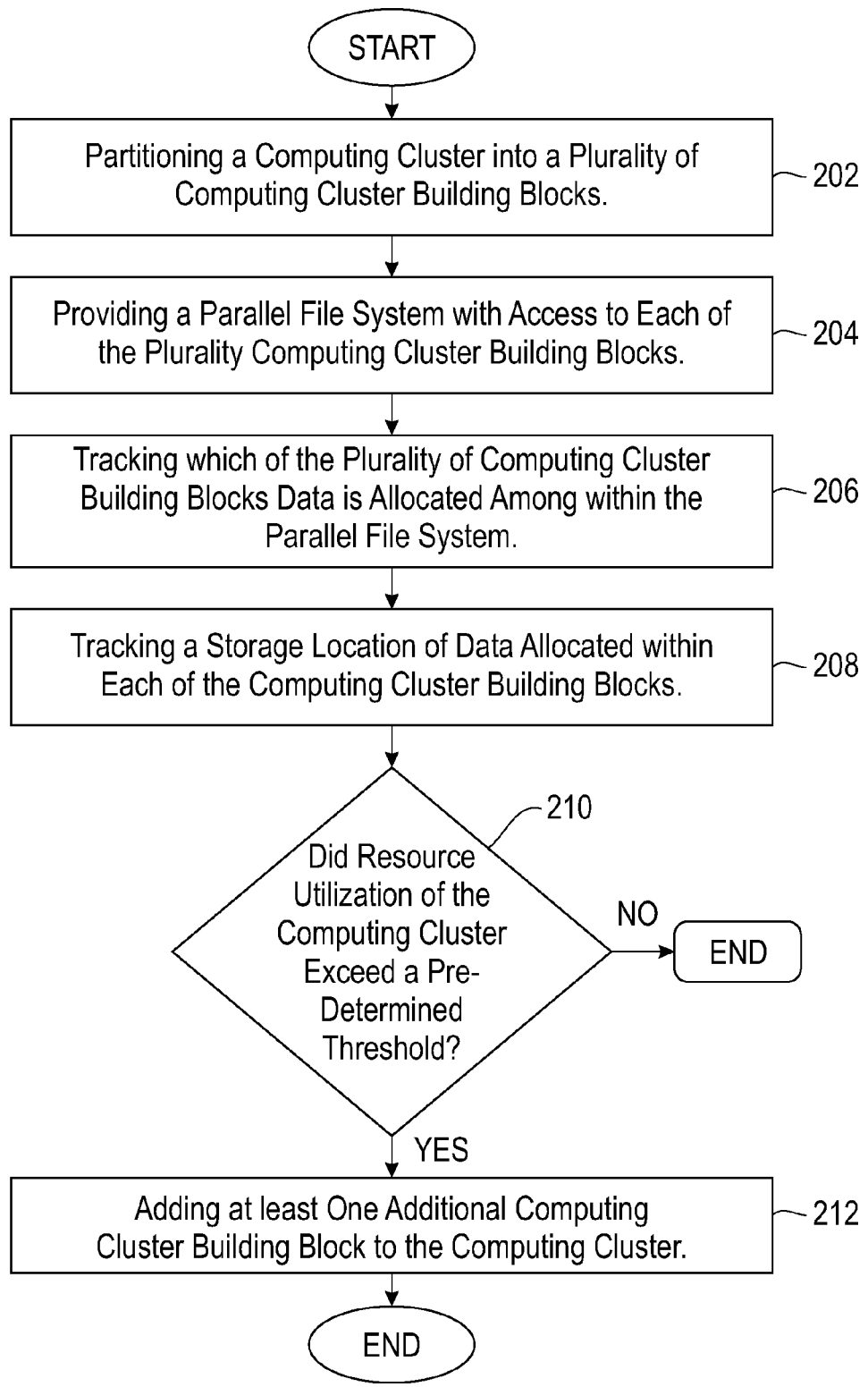
FIG. 2 illustrates a flow chart of a method for reducing inter-switch performance bottlenecks in a parallel file system, according to one embodiment.

FIG. 2 illustrates a flow chart of a method 200 for reducing inter-switch performance bottlenecks in a parallel file system, according to one embodiment. In step 202, the computing cluster 100 is partitioned into a plurality of computing cluster building blocks 104a, 104b . . . 104n. The plurality of computing cluster building blocks 104a, 104b . . . 104n comprises a single parallel file system.

In one embodiment, each computing cluster building block 104a, 104b . . . 104n includes a file system client. For example, the file system client serves a file system application request. In an exemplary embodiment, the file system client is embodied in software and resides on compute node 108. In another embodiment, each computing cluster building block 104a, 104b . . . 104n further includes a storage module coupled to the file system client. For example, the storage module serves a data request for the file system client. The software module is embodied in software and resides on storage node 110.

In an exemplary embodiment, computing cluster building block 104a, 104b . . . 104n includes a plurality of nodes (i.e., servers). The plurality of nodes is logically divided into a set of compute nodes 108 and storage nodes 110, with file data and metadata striped across the storage nodes 110. In another embodiment, each of the plurality of nodes in a computing cluster building block 104a, 104b . . . 104n is both a compute node and storage node. In another embodiment, the compute node and storage nodes stand alone.

The logical division of storage nodes 110 and compute nodes 108 provides flexibility in the architecture of the plurality of computing cluster building blocks 104a, 104b . . . 104n. For example, storage disks can be either spread across every node, or consolidated in a few robust storage nodes (e.g. with quad-GigE or 10 GigE Ethernet cards) and connected to commodity disk arrays. Compute intensive data centers may focus on a larger number of compute nodes 108 per computing cluster building block 104a, 104b . . . 104. Storage heavy data centers may increase the number of storage nodes 110 per computing cluster building block 104a, 104b . . . 104n.

In another embodiment, each computing cluster building block's storage system 112 would comprise a SAN. For example, a SAN in each computing cluster building block 104a, 104b . . . 104n would allow direct data access from every compute node 108 and storage node 110 in within the computing cluster building block 104a, 104b . . . 104n.

At step 204, the parallel file system is provided with access to each of the plurality computing cluster building blocks 104a, 104b . . . 104n. In one embodiment, the file system network switch 102 is coupled to the building block network switch 106 to provide the parallel file system with access to each of the plurality computing cluster building blocks 104a, 104b . . . 104n.

At step 206, the file system metadata module 116 tracks which of the plurality of computing cluster building blocks 104a, 104b . . . 104n data is allocated among within the parallel file system. The file system metadata module 116 tracks which of the plurality of computing cluster building blocks 104a, 104b . . . 104n data is allocated among within the parallel file system. In one embodiment, file system jobs are launched on a compute node 108 in the computing cluster building block 104a, 104b . . . 104n where data for the job resides. Accordingly, the parallel file system avoids interswitch bottlenecks by launching jobs in the computing cluster building block 104a, 104b . . . 104n where data for the job resides.

At step 208, the building block metadata module 114 tracks a storage location of data allocated within each of the computing cluster building blocks 104a, 104b . . . 104n.

At step 210, the method 200 determines whether resource utilization of the computing cluster 100 has exceeded a pre-determined threshold. The method 200 ends if resource utilization of the computing cluster 100 has not exceeded the pre-determined threshold. The method 200 proceeds to step 212 if resource utilization of the computing cluster 100 has exceeded the pre-determined threshold. At step 212, at least one additional computing cluster building block 104a, 104b . . . 104n to the computing cluster 100.

In one embodiment, the resource utilization refers to available storage in storage subsystem 112 in a computing cluster building block 104a, 104b . . . 104n. In another embodiment, the resource utilization refers to central processing unit (CPU) utilization of compute nodes 108 in a computing cluster building block 104a, 104b . . . 104n. In another embodiment, the resource utilization refers to central processing unit (CPU) utilization of storage nodes 110 in a computing cluster building block 104a, 104b . . . 104n.

In an exemplary embodiment, when storage utilization, is in the range of 25% to 100%, preferably at 50%, in a computing cluster building block 104a, 104b . . . 104n, a system administrator would determine whether additional storage disks can be added to storage subsystem 112. The preferred utilization is not above 50% because storage capacity can be utilized to full capacity quickly and amount of time necessary to make storage changes in the computing cluster 100, in a data center, may vary. The preferred utilization is not below 50% because storage capacity is still available and a computing cluster building block may have a large amount of storage for which sufficient storage is available at 50%, for which additional storage may not be cost efficient. Accordingly, the storage utilization threshold will depend on the total capacity of a storage system 112 in computing cluster building block 104a, 104b . . . 104n.

In another exemplary embodiment, when storage utilization exceeds the threshold in a computing cluster building block 104a, 104b . . . 104n, a system administrator would determine whether storage disks can be replaced with storage disks of a larger capacity in storage subsystem 112. In another exemplary embodiment, when storage utilization exceeds the threshold in a computing cluster building block 104a, 104b . . . 104n, an additional computing cluster building block 104a, 104b . . . 104n would be added to the computing cluster 100.

In an exemplary embodiment, when CPU utilization on compute nodes 108, is in the range of 50% to 100%, preferably above 60%, a system administrator would determine whether additional compute nodes can be added to a computing cluster building block 104a, 104b . . . 104n. The preferred CPU utilization is not above 60% because of potential risk of downtime if CPU utilization reaches capacity as CPU utilization varies. In addition, the task of increasing available compute resources can take a long time for a production computing cluster 100 in a data center. The preferred utilization is not below 60% because of cost of compute resources for which below 60% would not be cost efficient.

In an exemplary embodiment, additional compute nodes can be added to a computing cluster building block 104a, 104b . . . 104n with CPU utilization above the threshold, if there are additional network ports on a building block network switch 106. In another exemplary embodiment, an additional computing cluster building block can be added to a computing cluster 100, if there are not sufficient network ports on a building block network switch 106 to ensure CPU utilization is below 60% utilization.

Figure 3:
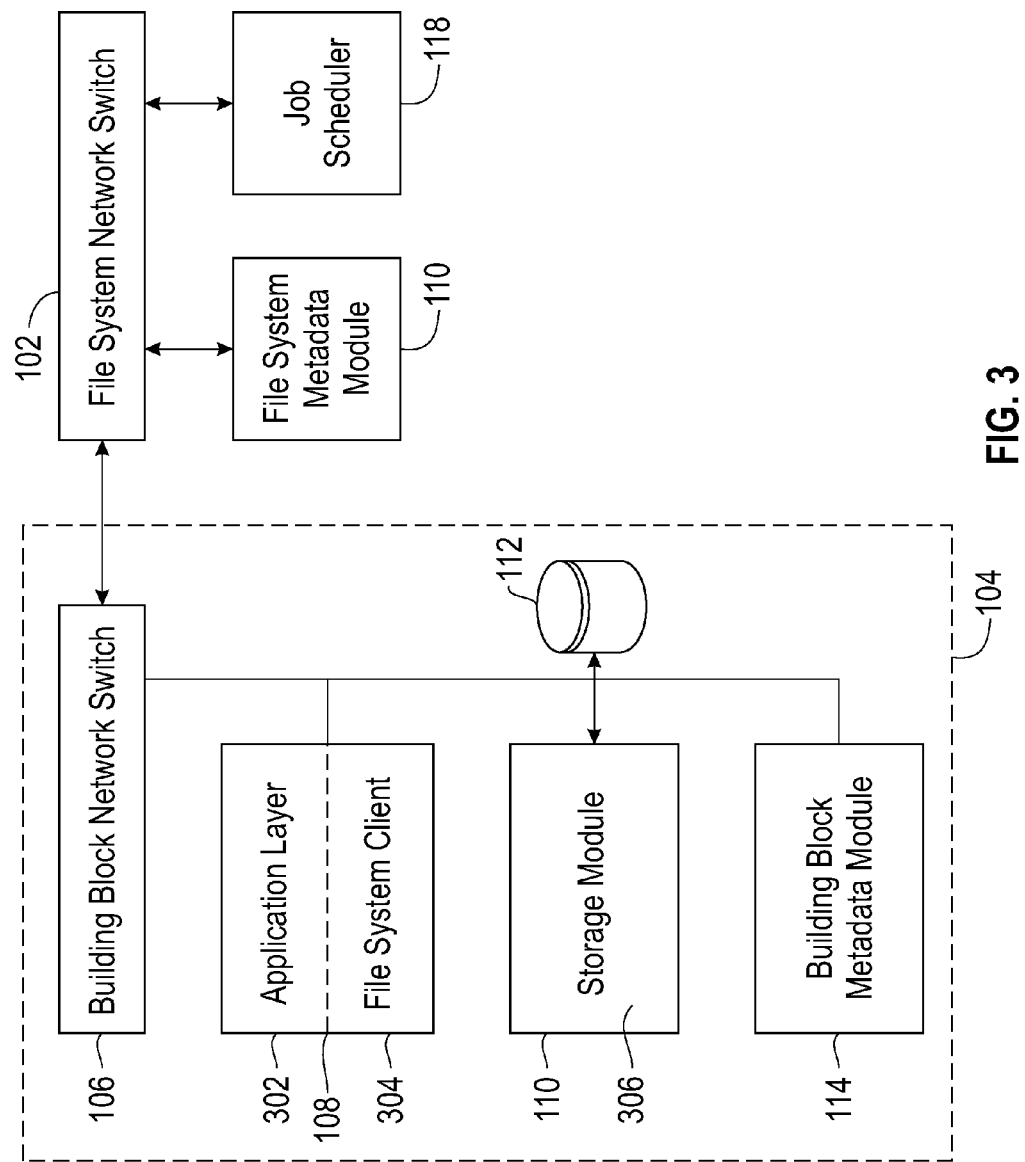
FIG. 3 illustrates a computing cluster building block of the computing cluster with a switch-aware parallel file system shown in FIG. 1, according to one embodiment.

FIG. 3 illustrates a computing cluster building block 104 of the computing cluster 100 with a switch-aware parallel file system shown in FIG. 1, according to one embodiment. All file system operations (e.g., create, write, read, and delete) within a computing cluster building block 104 are handled by the computing cluster building block's file system. In one embodiment, each of the plurality of computing cluster building blocks 104a, 104b . . . 104n may use a different file system. For example, each subtree of a file system is fully located within a single computing cluster building block 104 (e.g., all files under /bb1 stored in the 1st building block, all files in /bb2 stored in the 2nd building block, etc). In one embodiment, each file system data object is striped or located within a single computing cluster building block 104.

The computing cluster building block 104 includes a compute node 108. In one embodiment, the compute node 108 comprises an application layer 302. For example, applications residing on a computing node 108 interfaces with the application layer 302 to handle file system communications, including communications with the file system metadata module 116. In another embodiment, the compute node 108 includes a file system client 304. For example, the file system client 304 serves application requests for applications residing in the application layer 302 within the same computing cluster building block 104. The layer for the file system client 304 is between the application layer 302 and a layer for a storage module 306.

The computing cluster building block 104 further includes a storage module 306. The storage module 306 may stand-alone on storage node 110 or be embodied on an overlapping compute node 108 within each computing cluster building block 104. Ratio of storage nodes 110 to compute nodes 108 may vary depending on capacity and performance requirements. The storage module 306 is coupled to storage subsystem 112. In one embodiment, the file system client 304 writes data to the data object by striping the data to the storage module 306 within the computing cluster building block 104. In another embodiment, data from a single data object is stripped across multiple building blocks 104a, 104b . . . 104n.

The switch-aware parallel file system may employ several different techniques to recover from a failure of a compute node 108 within a computing cluster building block 104 or a failure of a building block network switch 106. In one embodiment, the switch-aware parallel file system replicates data between each of the plurality of computing cluster building blocks 104a, 104b . . . 104n so that every file can be accessed from multiple computing cluster building blocks 104a, 104b . . . 104n. In another embodiment, each storage node is connected to building block network switches 106 in multiple computing cluster building blocks 104a, 104b . . . 104n.

In another embodiment, storage subsystem 112 (e.g., SAN or a SAS disk array) is connected to two or more storage nodes 306 in different computing cluster building blocks 104a, 104b . . . 104n. Storage subsystem 112 connected to two or more storage nodes 306 in different computing cluster building blocks 104a, 104b . . . 104n creates Active-Passive storage nodes 306 for each storage subsystem disk. For example, when data is not accessible via the primary ("active") storage node 110, compute nodes 108 can use the backup ("passive") storage node 110. Any technique to eliminate data loss known to one skilled in the art may be employed for fault tolerance. For example, network RAID 5 across storage nodes 108 with replication between storage nodes 108.

The computing cluster building block 104 further includes a building block metadata module 114. The building block metadata module 114 creates a data object for data to be written to, the data object being created in response to a data request by the file system client 304. For example, a data object includes any object in the parallel file system, including a file and a directory. A data object may be created in the parallel file system with use of any file system data object creation operation known to one skilled in the art.

In one embodiment, the file system client 304 initiates the creation of a data object for an application residing in the application layer 202 of the compute node 108. The file system client 304 sends a request to create a data object to the building block metadata module 114. The building block metadata module 114 creates a data object in computing cluster building block local base pathname plus file pathname (e.g., /bb1/file1). For example, a data object is created in the local computing cluster building block 104. The building block metadata module 114 sends a request to file system metadata module 116 to inform the computing cluster's 100 file system of a new file in a computing cluster building block 104, if files are striped across multiple computing cluster building blocks 104a, 104b . . . 104n.

In another embodiment, the file system client 304 initiates the reading (e.g. accessing) of a data object for an application residing in the application layer 202 of the compute node 108. The file system client 304 sends a request to file system metadata module 116 to determine which computing cluster building block 104 the data object to be read resides. The file system metadata module 116 returns the base pathname of the computing cluster building block 104 where the data object resides (e.g., /bb1) to the file system client 304. The file system client 304 appends a base pathname to file name.

In an exemplary embodiment, the file system client 304 uses the building block metadata module 114 to determine where (e.g. storage subsystem 112) in the computing cluster building block 104 the data object resides. The building block metadata module 114 sends a request to file system metadata module 116 to determine the computing cluster building blocks 104a, 104b . . . 104n for the data object, if the data object is striped across multiple computing cluster building blocks 104a, 104b . . . 104n. For example, a data object may be read in the switch-aware parallel file system using any normal file system data object reading operation known to one skilled in the art.

In another embodiment, the file system client 304 initiates modifying (e.g. writing) a data object for an application residing in the application layer 202 of the compute node 108. The file system client 304 uses the building block metadata module 114 to write data across the storage module 306, if data is not stripped across computing cluster building blocks 104a, 104b . . . 104n.

In an exemplary embodiment, the file system client 304 sends a request to file system metadata module 116 to determine the computing cluster building blocks 104a, 104b . . . 104n on which the data should be modified, if the data object to be modified is stripped across the plurality of computing cluster building blocks 104a, 104b . . . 104n. The file system client 304 uses the building block metadata module 114 of each computing cluster building block 104 to modify data stripped across storage modules 306 within each computing cluster building block 104.

In another embodiment, the file system client 304 initiates the removal (i.e., deletion) of a data object for an application residing in the application layer 202 of the compute node 108. The file system client 304 sends a remove object request to building block metadata module 114 to delete data. For example, the building block metadata module 114 removes a file in computing cluster building block local base pathname plus file pathname (e.g., /bb1/file1).

In an exemplary embodiment, the build block metadata module 114 sends a request to file system metadata module 116 to inform of a removed data object, if the data object was striped across a plurality of the computing cluster building blocks 104a, 104b . . . 104n. The file system client 304 communicates with the file system and building block metadata module(s) 114 to perform all other file system actions (e.g., link, rename, symlink).

The building block metadata module 114, storage module 306, and compute node 108 are coupled together by the building block network switch 106. The building block network switch 106 is coupled to the file system network switch 102 to provide the switch-aware parallel file system with access to the computing cluster building block 104a, 104b . . . 104n. The file system network switch 102 is coupled to the file system metadata module 116 to track which of the plurality of computing cluster building blocks 104a, 104b . . . 104n data is allocated among within the parallel file system.

In one embodiment, the computing cluster 100 further comprises a job scheduler 118. In an exemplary embodiment, the job scheduler is embodied in software and resides on a stand-alone server in the computing cluster 100. In another exemplary embodiment, the job scheduler resides on a node in the computing cluster 100 were the file system metadata module resides. In one embodiment, the job scheduler 118 spawns a file system job on at least one of the plurality of computing cluster building blocks 104a, 104b . . . 104n. For example, a file system job may include any computer program, file system task, or application. In another embodiment, the job scheduler 118 schedules the file system job to be spawned.

In one embodiment, the job scheduler 118 spawns the file system job on the at least one of the plurality of computing cluster building blocks 104a, 104b . . . 104n where data for the file system job is located, if there is pre-existing data for the file system job in the parallel file system. The job scheduler 118 sends a request to file system metadata module 116 to determine which of the plurality of computing cluster building blocks 104a, 104b . . . 104n data for the job(s) resides. The file system metadata module 116 returns to the job scheduler 118 the compute node(s) 108 in all the computing cluster building blocks 104a, 104b . . . 104n in which the data for the job(s) reside. In another embodiment, the job scheduler spawns the file system job on the at least one of the plurality of computing cluster building blocks 104a, 104b . . . 104n with the most resources being available. For example, the method to determine the compute node 108 on which to launch job can be any load balancing algorithm known to someone skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
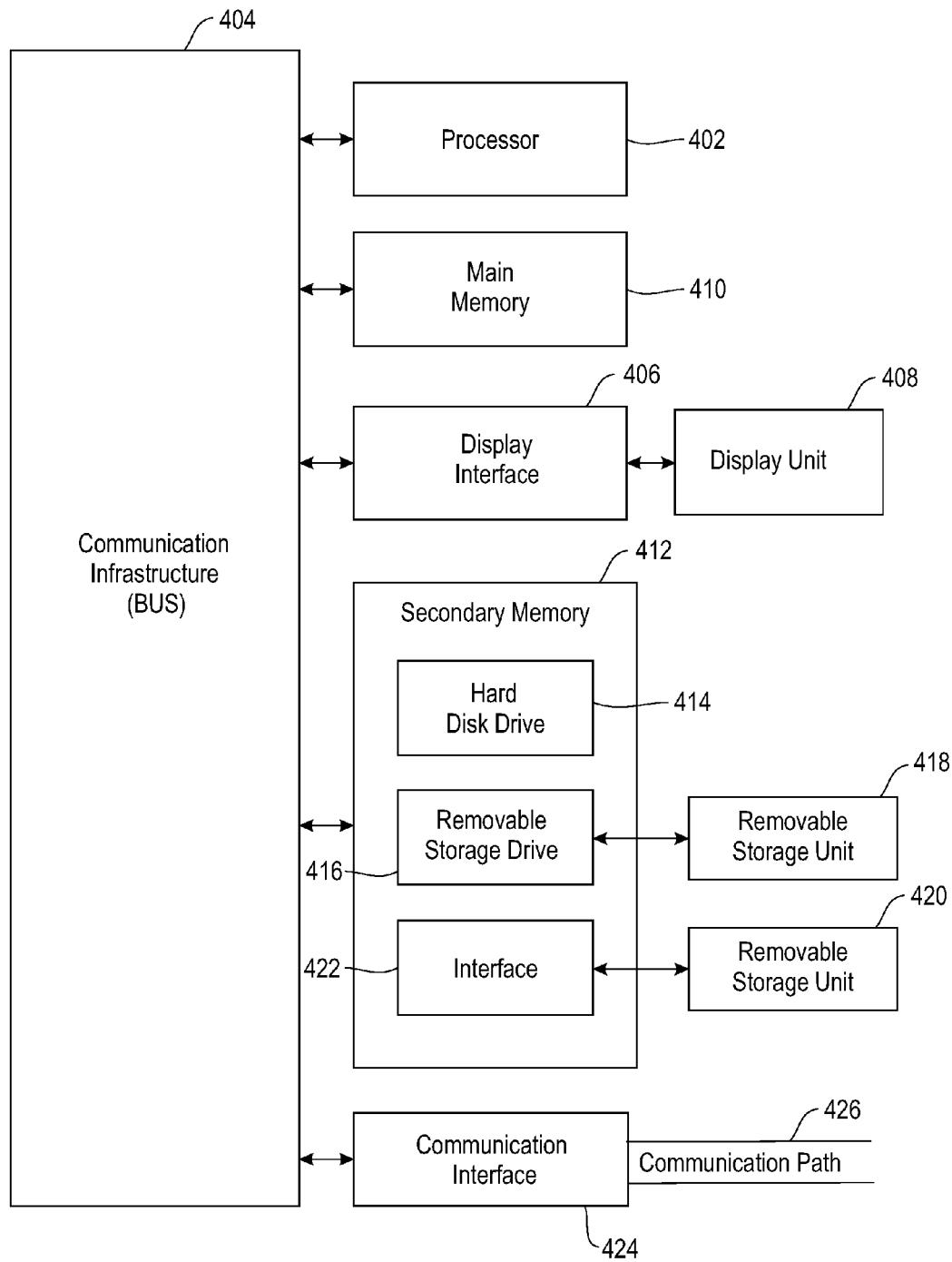
FIG. 4 illustrates a high level block diagram of a system for implementing an embodiment of the present invention.

FIG. 4 illustrates a high level block diagram showing an information processing system useful for implementing an embodiment of the present invention. The computer system includes one or more processors, such as a processor 402. The processor 402 is connected to a communication infrastructure 404 (e.g., a communications bus, cross-over bar, or network).

The computer system can include a display interface 406 that forwards graphics, text, and other data from the communication infrastructure 404 (or from a frame buffer not shown) for display on a display unit 408. The computer system also includes a main memory 410, preferably random access memory (RAM), and may also include a secondary memory 412. The secondary memory 412 may include, for example, a hard disk drive 414 and/or a removable storage drive 416, representing, for example, a floppy disk drive, a magnetic tape drive, or an optical disk drive. The removable storage drive 416 reads from and/or writes to a removable storage unit 418 in a manner well known to those having ordinary skill in the art. Removable storage unit 418 represents, for example, a floppy disk, a compact disc, a magnetic tape, or an optical disk, etc., which is read by and written to by removable storage drive 416. As will be appreciated, the removable storage unit 418 includes a computer readable medium having stored therein computer software and/or data.

In alternative embodiments, the secondary memory 412 may include other similar means for allowing computer programs or other instructions to be loaded into the computer system. Such means may include, for example, a removable storage unit 420 and an interface 422. Examples of such means may include a program package and package interface (such as that found in video game devices), a removable memory chip (such as an EPROM, or PROM) and associated socket, and other removable storage units 420 and interfaces 422 which allow software and data to be transferred from the removable storage unit 420 to the computer system.

The computer system may also include a communications interface 424. Communications interface 424 allows software and data to be transferred between the computer system and external devices. Examples of communications interface 424 may include a modem, a network interface (such as an Ethernet card), a communications port, or a PCMCIA slot and card, etc. Software and data transferred via communications interface 424 are in the form of signals which may be, for example, electronic, electromagnetic, optical, or other signals capable of being received by communications interface 424. These signals are provided to communications interface 424 via a communications path (i.e., channel) 426. This communications path 426 carries signals and may be implemented using wire or cable, fiber optics, a phone line, a cellular phone link, an radio frequency (RF) link, and/or other communication channels.

In this document, the terms "computer program medium," "computer usable medium," and "computer readable medium" are used to generally refer to media such as main memory 410 and secondary memory 412, removable storage drive 416, and a hard disk installed in hard disk drive 414.

Computer programs (also called computer control logic) are stored in main memory 410 and/or secondary memory 412. Computer programs may also be received via a communication interface 424. Such computer programs, when run, enable the computer system to perform the features of the present invention as discussed herein. In particular, the computer programs, when run, enable the processor 402 to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computing cluster for reducing inter-switch network traffic, comprising:
   two or more building blocks partitioned from said cluster, each building block including: a network switch that provides said cluster with access to the building block and is connected to other building blocks using a hierarchy of network switches, at least one computing server, at least one storage server, a storage system, and a server job scheduler that is in communication with said computing servers within the same building block;
   a parallel file system that provides parallel data access to computing servers within each building block and global access to data across said cluster using said switches, said file system including: a file system client on each computing server that serves file system application requests and has access to data allocated among each of the building blocks, a storage module on each storage server that stripes data across a storage system within a particular building block the storage module is located and serves data requests for the file system clients in said cluster, and a building block metadata module within each building block that tracks a storage location of data allocated by the storage module to the storage system within each building block, and a global metadata module that maintains file system metadata for said file system and said metadata including which building block data is allocated among within said file system; and
   wherein said scheduler schedules a job of said file system within a building block and spawns said job at a scheduled time: i) on at least one of at least one computing server in the same building block such that job requirements of the job are met, ii) on at least one of said building blocks where data for said job is located if there is pre-existing data for said job in said cluster, or iii) on at least one of said building blocks having most available resources if there is no pre-existing data for said job in said cluster.

2. The computing cluster of claim 1, wherein the building block metadata module creates a data object for data to be written to, the data object being created in response to a data request by a particular file system client within the same building block as the building block metadata module.

3. The computing cluster of claim 2, wherein the particular file system client writes data to the data object by striping the data across at least one storage module in the same building block as the particular file system client and reads the data from the data object by accessing the at least one storage module.

4. A method for reducing inter-switch network traffic in a computing cluster, comprising:
   partitioning said cluster into two or more building blocks, each building block including: a network switch that provides said cluster with access to the building block and is connected to other building blocks using a hierarchy of network switches, at least one computing server, at least one storage server, a storage system;
   providing, using a parallel file system, parallel data access to computing servers within each building block and global access to data across said cluster using said switches, said file system including: a file system client on each computing server serving file system application requesting and having access to data allocated among each of the building blocks, a storage module on each storage server striping data across a storage system within a particular building block the storage module is located and serves data requests for the file system clients in said cluster, and a building block metadata module within each building block tracking a storage location of data allocated by the storage module to the storage system within each building block, and a global metadata module maintaining file system metadata for said file system and said metadata including which building block data is allocated among within said file system; and
   scheduling a job of said file system within a building block and spawning said job at a scheduled time: i) on at least one of at least one computing server in the same building block such that job requirements of the job are met, ii) on at least one of said building blocks where data for said job is located if there is pre-existing data for said job in said cluster, or iii) on at least one of said building blocks having most available resources if there is no pre-existing data for said job in said cluster.

5. The method of claim of 4, further comprising adding at least one additional building block to said cluster if resource utilization of said exceeds a pre-determined threshold.

6. The method of claim 4, further comprising creating, by the building block metadata module, a data object for data to be written to, the data object being created in response to a data request by a particular file system client within the same building block as the building block metadata module.

7. The method of claim 6, further comprising writing data, by the particular file system client, to the data object by striping the data across at least one storage module in the same building block as the particular file system client and reading the data from the data object by accessing the at least one storage module.

8. A computer program product for reducing inter-switch network traffic in a computing cluster, said program product comprising a non-transitory computer readable storage medium having computer readable program code embodied therewith, said program code being executable by a computer to:
   partition said cluster into two or more building blocks, each building block including: a network switch that provides said cluster with access to the building block and is connected to other building blocks using a hierarchy of network switches, at least one computing server, at least one storage server, a storage system; and
   provide, using a parallel file system, parallel data access to computing servers within each building block and global access to data across said cluster using said switches, said file system including: a file system client on each computing server that serves file system application requests and has access to data allocated among each of the building blocks, a storage module on each storage server that stripes data across a storage system within a particular building block the storage module is located and serves data requests for the file system clients in said cluster, and a building block metadata module within each building block that tracks a storage location of data allocated by the storage module to the storage system within each building block, and a global metadata module that maintains file system metadata for said file system and said metadata includes which building block data is allocated among within said file system; and
   schedule a job of said file system within a building block and spawn said job at a scheduled time: i) on at least one of at least one computing server in the same building block such that job requirements of the job are met, ii) on at least one of said building blocks where data for said job is located if there is pre-existing data for said job in said cluster, or iii) on at least one of said building blocks having most available resources if there is no pre-existing data for said job in said cluster.

9. The computer program product of claim 8, said program code being further executable by the computer to create, by the building block metadata module, a data object for data to be written to, the data object being created in response to a data request by a particular file system client within the same building block as the building block metadata module.

10. The computer program product of claim 9, said program code being further executable by the computer to write data to the data object by striping the data across at least one storage module in the same building block as the particular file system client and read the data from the data object by accessing the at least one storage module.

* * * * *